US012767160B2

(12) United States Patent
Wang et al.

(10) Patent No.: US 12,767,160 B2
(45) Date of Patent: Oct. 20, 2026

(54) DRIVER AGGRESSION MONITORING DURING USE OF VEHICLE

(71) Applicant: FCA US LLC, Auburn Hills, MI (US)

(72) Inventors: Chunjian Wang, Troy, MI (US); Drushan A Mavalankar, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/635,396

(22) Filed: Apr. 15, 2024

(65) Prior Publication Data

US 2025/0319894 A1 Oct. 16, 2025

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2520/105* (2013.01); *B60W 2520/26* (2013.01); *B60W 2554/802* (2020.02)

(58) Field of Classification Search
CPC ................ B60W 50/14; B60W 40/09; B60W 2520/105; B60W 2520/26; B60W 2554/802
See application file for complete search history.

(56) References Cited

U.S. PATENT DOCUMENTS

| | | | |
|---|---|---|---|
| 6,392,564 B1 | 5/2002 | Mackey et al. | |
| 10,040,459 B1 | 8/2018 | Kukreja | |
| 11,407,370 B2 | 8/2022 | Seger | |
| 11,508,236 B2 * | 11/2022 | Chen | G06V 40/20 |
| 12,152,893 B2 | 11/2024 | Zhu | |
| 2008/0120025 A1 | 5/2008 | Naitou | |
| 2010/0131148 A1 | 5/2010 | Camhi | |
| 2014/0236466 A1 | 8/2014 | Doron | |
| 2016/0023554 A1 | 1/2016 | Tseng | |
| 2017/0183009 A1 * | 6/2017 | Isono | B60L 15/2009 |

(Continued)

FOREIGN PATENT DOCUMENTS

| | | | |
|---|---|---|---|
| CA | 3105835 | A1 | 1/2020 |
| TW | I754068 | B | 2/2022 |

(Continued)

OTHER PUBLICATIONS

"Optimize fleet performance: the effects of aggressive braking and acceleration," smith System. 2023, p. 3/8.*

(Continued)

*Primary Examiner* — Brian A Zimmerman
*Assistant Examiner* — Cal J Eustaquio
(74) *Attorney, Agent, or Firm* — Jeremy J. Klobucar

(57) ABSTRACT

A method of determining an aggression rating during operation of a vehicle includes monitoring or determining a first acceleration of a vehicle, determining an aggression rating based at least in part on a magnitude of the first acceleration, comparing the first acceleration to a first acceleration threshold, and providing an output to a driver of the vehicle when the first acceleration exceeds the first acceleration threshold. The method may also or instead provide a report after operation of the vehicle during a trip to inform the driver of the certain dynamic parameters of the vehicle during the trip and the effect on energy use and vehicle efficiency.

19 Claims, 3 Drawing Sheets

(56) References Cited

U.S. PATENT DOCUMENTS

| | | | | |
|---|---|---|---|---|
| 2017/0236411 | A1* | 8/2017 | Sumers | H04W 4/027 701/117 |
| 2017/0309196 | A1 | 10/2017 | Vangala | |
| 2018/0005254 | A1* | 1/2018 | Bai | B60W 10/00 |
| 2018/0126785 | A1 | 5/2018 | Navarro-Losada | |
| 2019/0185009 | A1 | 6/2019 | Werner | |
| 2019/0291728 | A1* | 9/2019 | Shalev-Shwartz | B60W 30/0956 |
| 2020/0290577 | A1* | 9/2020 | Berntorp | B60T 8/1725 |
| 2021/0125076 | A1 | 4/2021 | Zhang et al. | |
| 2022/0028183 | A1 | 1/2022 | Cha | |
| 2023/0073151 | A1* | 3/2023 | Ucar | B60W 50/14 |
| 2023/0132573 | A1 | 5/2023 | Zabe | |
| 2023/0132673 | A1 | 5/2023 | Russo | |
| 2023/0150394 | A1 | 5/2023 | Diamond | |
| 2023/0230502 | A1* | 7/2023 | Moehr | G09B 19/167 |
| 2023/0267399 | A1 | 8/2023 | Howard | |
| 2023/0271618 | A1 | 8/2023 | Chandra | |
| 2024/0025418 | A1 | 1/2024 | Liao | |
| 2025/0115273 | A1* | 4/2025 | Best | B60W 40/09 |

FOREIGN PATENT DOCUMENTS

| | | | |
|---|---|---|---|
| WO | WO2019174932 | A1 | 9/2019 |
| WO | WO2020205648 | A1 | 10/2020 |

OTHER PUBLICATIONS

National Aeronautics and Space Administration. "Newton's Second Law Definitions." Benson, T. (Year: 2021).*

Non-Final Office Action for U.S. Appl. No. 18/635,384 dated Jul. 2, 2025, (24 pages).

Non-Final Office Action for U.S. Appl. No. 18/635,424 dated Aug. 25, 2025, (24 pages).

Non-Final Office Action for U.S. Appl. No. 18/635,411 dated Nov. 13, 2025, (11 pages).

Final Office Action for U.S. Appl. No. 18/635,384 dated Jan. 14, 2026, (36 pages).

* cited by examiner

DRIVER AGGRESSION MONITORING DURING USE OF VEHICLE

FIELD

The present disclosure relates to a system for real-time driver aggressiveness monitoring.

BACKGROUND

Drivers of vehicles vary in their habits, including accelerations, braking, speed and the like. The more aggressive a driver is, the more energy may be used in operation of the vehicle, the less stable the vehicle may be in operation and the vehicle and components thereof may wear out sooner. Many drivers do not understand the extent of their aggressive driving or the effects thereof, including the effect on and increased cost of energy use.

SUMMARY

In at least some implementations, a method of determining an aggression rating during operation of a vehicle includes monitoring or determining a first acceleration of a vehicle, determining an aggression rating based at least in part on a magnitude of the first acceleration, comparing the first acceleration to a first acceleration threshold, and providing an output to a driver of the vehicle when the first acceleration exceeds the first acceleration threshold.

In at least some implementations, the first acceleration threshold is associated with an increasing vehicle speed and the threshold is set as a function of a magnitude of acceleration at which a tire of the vehicle will slip. In at least some implementations, the magnitude of acceleration at which a tire of the vehicle will slip is determined based upon actuation of a traction control system of the vehicle. In at least some implementations, the first acceleration threshold is set at a magnitude of acceleration below that at which a tire of the vehicle will slip.

In at least some implementations, the method includes determining a second acceleration of the vehicle, wherein the second acceleration is associated with a decreasing speed of the vehicle. In at least some implementations, the aggression rating is determined at least in part as a function of a magnitude of the second acceleration.

In at least some implementations, the method includes determining a third acceleration of the vehicle, wherein the third acceleration is a lateral acceleration associated with turning of the vehicle. In at least some implementations, the aggression rating is determined at least in part as a function of a magnitude of the third acceleration.

In at least some implementations, the aggression rating includes a baseline aggression level that is less than the first acceleration threshold.

In at least some implementations, the method includes determining a vehicle speed, comparing the vehicle speed to a speed threshold and providing an output to the driver of the vehicle that includes information relating to a differential between the vehicle speed and the speed threshold.

In at least some implementations, the first acceleration threshold is adjusted as a function of a driving condition that is determined to reduce a traction level of the vehicle.

In at least some implementations, the method includes determining a following distance of the vehicle, and wherein the aggression rating is based in part on the determined following distance.

In at least some implementations, the first acceleration is associated with an increasing speed of the vehicle, and a second acceleration is monitored and a third acceleration is monitored, the second acceleration is associated with a decreasing speed of the vehicle and the third acceleration is associated with turning of the vehicle, and the output is provided when the second acceleration exceeds a second acceleration threshold or when the third acceleration exceeds a third acceleration threshold.

In at least some implementations, the method includes determining one or more driving conditions that affect a traction level of the vehicle, and adjusting the first acceleration threshold as a function of the one or more driving conditions.

In at least some implementations, a method of determining an aggression rating during operation of a vehicle includes monitoring a first acceleration of a vehicle, determining a current aggression rating based at least in part on a magnitude of the first acceleration compared to a baseline aggression rating, and providing an output to a driver of the vehicle including information relating to the current aggression rating.

In at least some implementations, the method includes determining a second acceleration of the vehicle, the second acceleration is associated with a decreasing speed of the vehicle and the aggression rating is determined at least in part as a function of a magnitude of the second acceleration.

In at least some implementations, the method includes determining a third acceleration of the vehicle, the third acceleration is associated with turning the vehicle and the aggression rating is determined at least in part as a function of a magnitude of the third acceleration.

In at least some implementations, one of the first acceleration and the second acceleration is given a positive magnitude and the other of the first acceleration and the second acceleration is given a negative magnitude. In at least some implementations, the magnitude of acceleration for a given aggression rating is different for the first acceleration than for the second acceleration.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
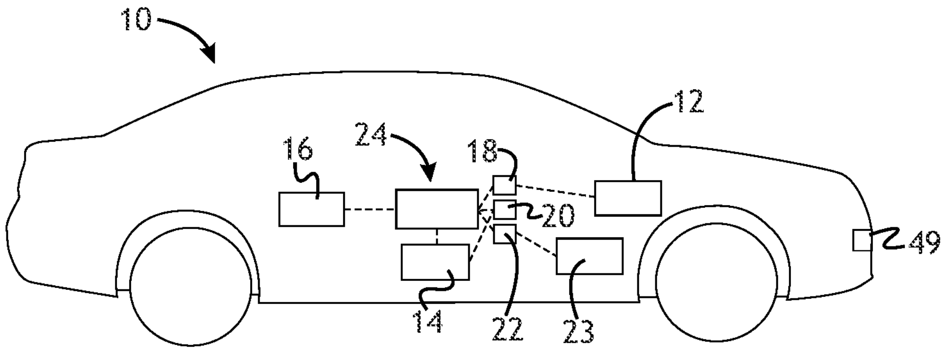
FIG. 1 is a diagrammatic side view of a vehicle including various sensors and systems.

Referring in more detail to the drawings, FIG. 1 illustrates a vehicle 10 that includes a prime mover 12 that may include a combustion engine, one or more electric motors or both an engine and motor(s), as in a hybrid vehicle 10. The vehicle 10 also includes a brake system 14 that functions to slow and stop the vehicle 10. In the example of a combustion engine or hybrid vehicle, a fuel tank may define all or part of a supply 16 of propulsion energy that may be used for propulsion of the vehicle 10. In an electric or hybrid vehicle, one or more batteries define at least part of the energy supply 16 in which electrical energy is stored to power a motor for vehicle propulsion. The vehicle 10 includes a throttle input 18 (e.g. accelerator pedal) and a brake input 20 (e.g. brake pedal) that allow driver controlled operation of the prime mover 12 and the brake system 14, and a steering input 22 (e.g. steering wheel or the like) that permits control of the vehicle direction via a suitable steering system 23. The throttle, braking and steering functions may also be done semi or fully autonomously, if desired.

To control various functions of the vehicle 10, the vehicle 10 has a control system 24, among other things, controls operation of the prime mover 12 of the vehicle 10. For example, the vehicle 10 may include drive by wire, brake by wire and steer by wire systems, or the drive, brake and steering systems may be mechanically linked, as desired, and the control system 24 may be programmed or include instructions to respond to driver action, such as movement of the throttle and brake inputs. The magnitude of the power output from the prime mover 12 and brake system 14 varies as a function of the driver operation of the throttle and brake inputs 18, 20, as well as the instructions executed by the control system 24, which may vary in different circumstances and may be implemented in view of variables and by way of look-up tables, maps, algorithms and the like.

To enable control and monitoring of various vehicle operating, environmental and other conditions related to vehicle operation, the control system 24 may include or be communicated with a range of sensors. By way of some examples, the vehicle 10 may include: a speed sensor 26 that provides an indication of vehicle speed; one or more accelerometers 30 responsive to vehicle accelerations in various directions and orientations; wheel speed sensors 32 responsive to the rotational speed of the vehicle wheels; drive input sensors (separate sensors, collectively referred to as 34) that sense the position and/or rate of movement of the throttle, brake and/or steering inputs 18, 20, 22, position or location sensors 36 or devices (such as GPS or the like) to determine the location of the vehicle; temperature sensors 38 for various things like ambient temperature, engine/motor temperature, battery temperature and the like; steering angle sensor 40 to enable determination of a vehicle steering angle; energy level sensors 42 like a fuel gauge or battery charge sensor that provide an indication of propulsion energy level remaining in the vehicle energy supply; and various other sensors that may be responsive to or useful in determining power output and/or energy consumption from the prime mover 12 (e.g. current draw of motors, or torque sensors).

In order to perform the functions and desired processing set forth herein, as well as the computations therefore, the control system 24 may include, but is not limited to, one or more controller(s), processor(s), computer(s) (generally referred to at 44), DSP(s), memory 46, storage, register(s), timing, interrupt(s), communication interface(s), and input/output signal interfaces, and the like, as well as combinations comprising at least one of the foregoing. For example, the control system 24 may include input signal processing and filtering to enable accurate sampling and conversion or acquisitions of such signals from communications interfaces and sensors. As used herein the terms control system 24 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 24 may be distributed among different vehicle modules, such as an infotainment control module, engine control module or unit, powertrain control module, transmission control module, and the like, if desired, and the memory and one or more processors may be one or both integrated into the vehicle 10 or remotely located and wirelessly communicated to the vehicle 10, as desired.

The term "memory" or "storage" as used herein can include computer readable memory, and may be volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system and/or instructions executable by a processor or controller or the like to enable control or allocate resources of a computing device.

Figure 2:
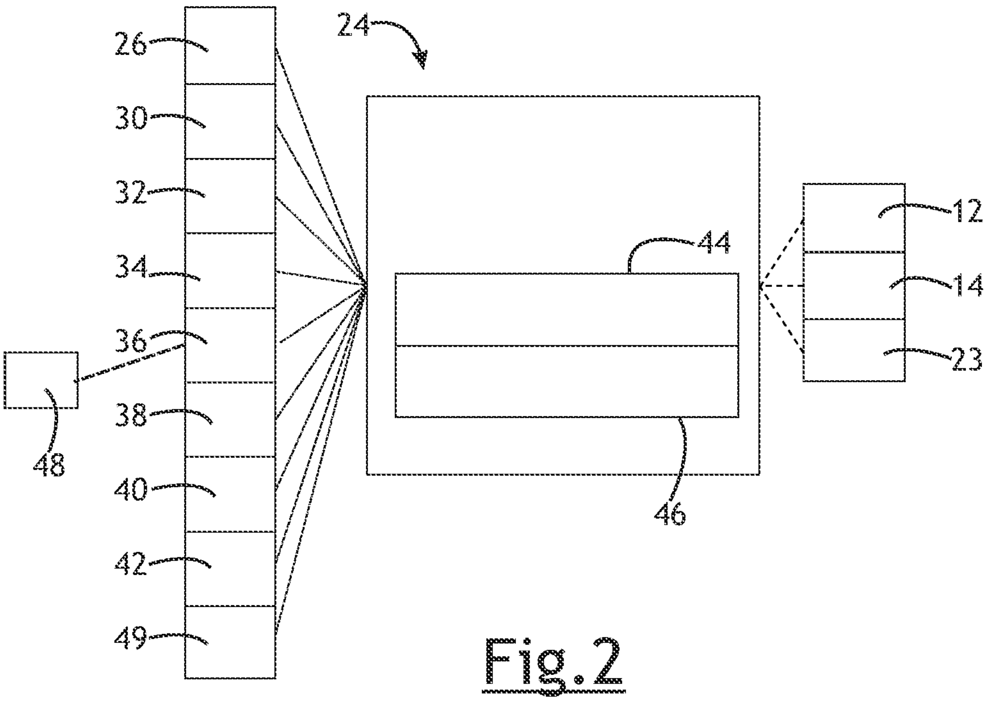
FIG. 2 is a diagrammatic view of a control system and sensors and drive, brake and steering systems.

Various navigation programs 48 (FIG. 2) are known that compute a travel path to a destination, and convey information about the travel path to a driver in the form of visual and/or audible instructions for navigating the vehicle along the travel path. The navigation programs can use information from the location sensor 36 (e.g. GPS) and map data and information relating to road conditions, speed limits, location of intersections and traffic signals, and the level of traffic (such as is available from Waze, GoogleMaps and other applications and sources). This information can be used to define travel paths that are shortest in total distance or time, or that avoid certain road types (e.g. not paved, toll roads, etc) or areas where travel time is less certain, for example, construction zones. The navigation programs 48 may be integrated into the vehicle control system 24 or infotainment system (which may be considered part of the control system), and/or can be resident on a mobile device that is connected to the vehicle 10 by wired or wireless connection.

Navigation programs may use data from numerous tracked vehicles currently traveling along, or that previously traveled along, roads within the travel path to provide crowd-sourced instantaneous and historical information about timing/duration of traffic patterns, average vehicle speeds by road, portions of roads, time of day, day of week, time of year, and the like. From this bulk information provided from many vehicles, the navigation programs can compare different route options that may be used in the travel path, and an estimated total time of travel can be provided, usually in the form of an estimated time of arrival at the chosen destination that is based on travel times and parameters along the entire travel path.

The travel path may include different types of roads, like city roads, rural roads, highways or other higher speed roads, that have different road conditions like speed limits, construction zones, intersections and stopping points which may be defined by traffic signs or traffic lights, for example. In addition to road conditions, the roads may have traffic levels that vary over time and may reduce travel speed as well as the number of stopping, braking and acceleration events when traveling on a road at a given time. Such variables and factors can affect the travel time and may affect the route chosen for the travel path to avoid, for examples, high traffic areas where travel will be slower.

The navigation information and the estimates of time to traverse the entire travel path, and various portions of segments of the travel path, can be less relevant to at least some drivers based on the driving habits of individual drivers. Similar, vehicle range capability (miles that can be traveled on current fuel or energy level in the vehicle 10) can vary considerably based on driving habits. Different rates of accelerations and traveling at different speeds, among other factors, can vary the energy consumption of a vehicle 10. People who drive less aggressively and/or at slower speeds may take longer to move along a travel path and arrive later than estimated by a navigation program. And such people may consume less energy and be able to travel further for a given vehicle energy level such that range estimations suggest unnecessary refueling or recharging iterations. Conversely, people who drive more aggressively and/or at faster speeds may take less time to move along a travel path and arrive earlier than estimated by a navigation program. And such people may consume more energy and be able to travel less distance for a given vehicle energy level such that range estimations do not accurately reflect needed refueling or recharging iterations. In this example, planning a trip to ensure adequate opportunities for refueling or recharging is difficult.

The systems and methods disclosed herein enable, among other things, driver specific driving habits and styles to be determined in real-time, as the vehicle is being driven. The systems and methods may determine one or more accelerations relating to forward acceleration, braking and turning of the vehicle, and from the acceleration data the systems and methods may determine a driver aggression rating. A greater acceleration is evidence of more aggressive driving and results in a higher driver aggression rating. Accelerations at or within a certain threshold of a vehicle maximum acceleration, or beyond a threshold above a road speed limit, by way of non-limiting examples, may result in a higher aggression rating such that the aggression rating need not be linear relative to a magnitude of acceleration or magnitude of another dynamic parameter. The accelerations and aggression rating may be continually monitored and determined, as desired, or the acceleration data may be filtered or averaged over a certain period of time, if desired.

Figure 3:
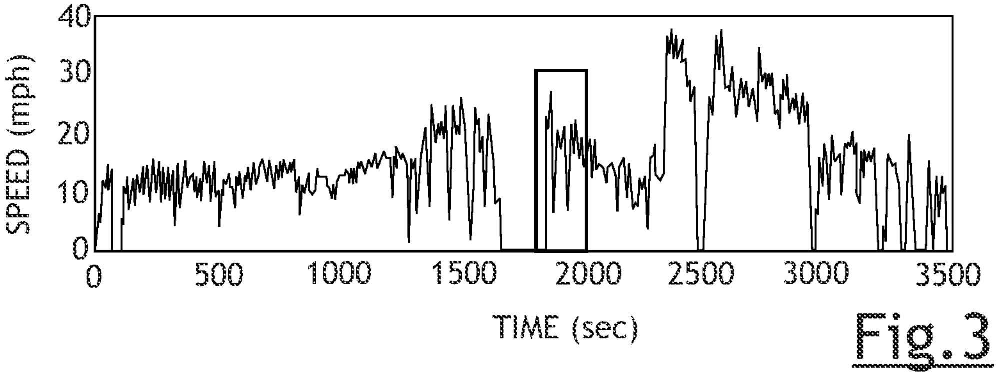
FIG. 3 is a graph of a vehicle speed over time.
Figure 4:
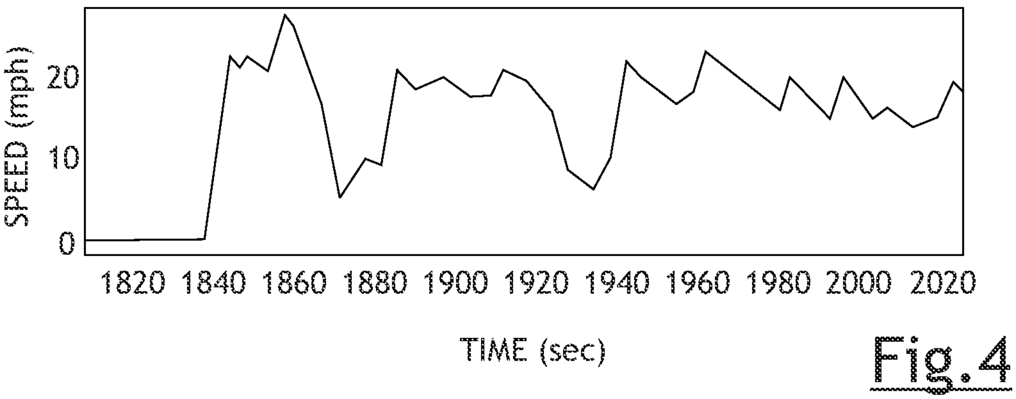
FIG. 4 is an enlarged view of a portion of FIG. 3.
Figure 5:
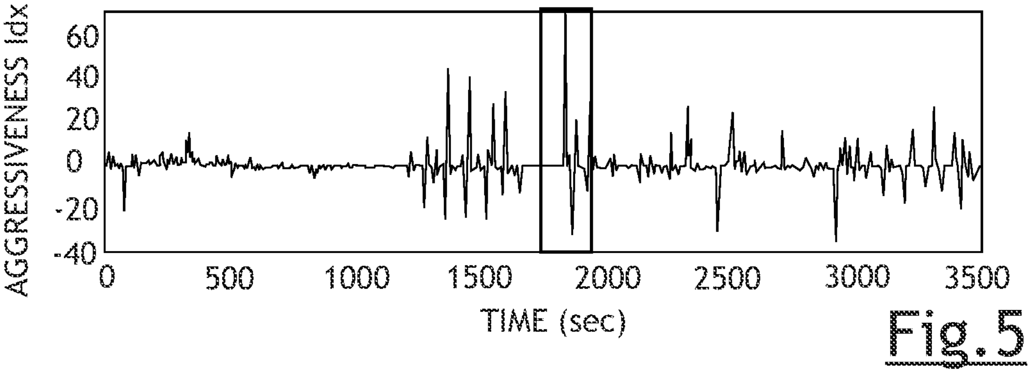
FIG. 5 is a graph of an aggression rating over the time corresponding to the graph of FIG. 3.
Figure 6:
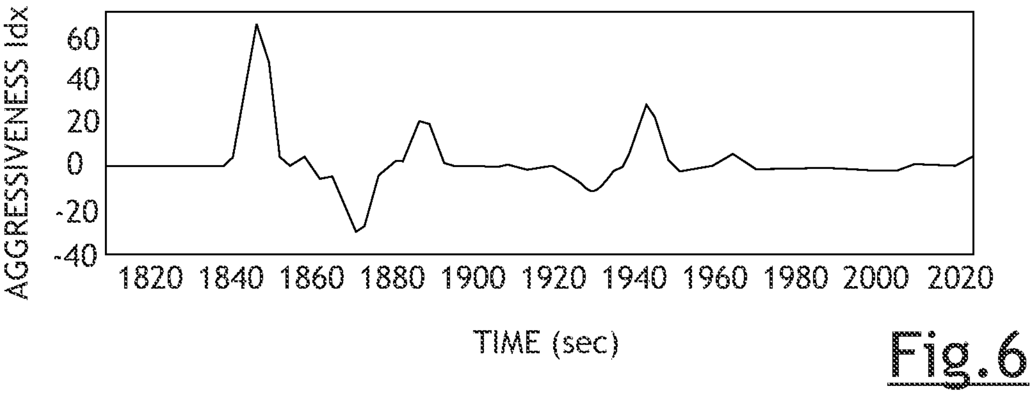
FIG. 6 is an enlarged view of a portion of FIG. 5 and corresponding to the time period shown in FIG. 4.

In at least some implementations, the accelerations of the vehicle are measured directly by the one or more accelerometers and/or by sensors responsive to changes in the position of the acceleration, brake and steering inputs. Forward acceleration may be considered separately from negative acceleration due to braking so that the aggression level or rating can be considered separately for these separate actions. FIG. 3 shows a plot of speeds over a period of time (e.g. accelerations) of a vehicle and FIG. 4 shows the portion of FIG. 3 that is within the rectangle. FIG. 5 shows an aggression rating that is determined by the control system as a function of the accelerations of FIG. 3, and FIG. 6 shows the aggression rating for the shorter time period shown in FIG. 4. In this way, and in this example, accelerations are tracked and forward accelerations result in a positive aggression number and braking accelerations (i.e. decelerations) are given a negative value relative to a baseline aggression rating of zero. In this way both the direction and magnitude can be tracked and may be used in determining an aggression rating, or for other things.

Further, the vehicle speed may be determined and compared to a speed limit for a road on which the vehicle is traveling, and a differential between the vehicle speed and the speed limit may be considered in the determination of an aggression rating. The speed-based aggression rating or portion thereof can be determined as a function of the actual speed differential (e.g. driving 30 mph on a road with a 25 mph speed limit results in a 5 mph differential) or as a function of a percentage difference (in this example, the difference would be 5 mph/25 mph or 20%), or a combination of these two.

The driving data or dynamic parameters of driving, including accelerations and speed, may be monitored continually and in real-time by which it is meant that the sensor signal/data output is collected and may be analyzed while the vehicle is in use, with normal delays for sensor data communication (e.g. signal or output cycle) and controller receipt and processing of the data. The data may be considered without regard to the type of road, time of day, weather and other factors, or these factors may be considered in conjunction with the driving data. In at least some implementations, the control system 24 is enabled to track dynamic parameters during vehicle operation and to associate those dynamic parameters with particular driving scenarios. Data from multiple sensors may be processed by the control system to enable a refined view of a driver's habits or style of driving, such as their relative aggression during driving. The data may be analyzed by a machine learning algorithm arranged to review various driving factors and the dynamic parameters, and to provide an analysis or determination of a driver's aggression.

In at least some implementations, the system defines a baseline for one or more dynamic parameters, and when the vehicle is operated at or below the baseline(s), the driver is given an average or low aggression rating. This baseline aggression rating may be zero on a scale of, for example, zero to one hundred, where one hundred is a maximum aggression rating. This is shown in the example of FIGS. 3-6, at time 1900 to 1920 and time 1980 to 2020. In FIGS. 3 and 4 it can be seen that the vehicle is traveling at a speed of between 10 mph and 20 mph and the aggression rating is zero or nearly zero, because the speed is within the baseline for this driving scenario and the accelerations are within a baseline or threshold range of acceleration. A higher aggression rating of about sixty is determined due to a significant forward acceleration of the vehicle between about time 1840 and about 1845, as shown in FIGS. 5 and 6, and a negative aggression rating of about negative thirty is determined at time 1870 due to a faster than threshold deceleration ending at about that time.

The magnitude of acceleration for a given aggression rating (e.g. positive or negative thirty) could but need not be the same for both forward and braking accelerations. In at least some implementations, the thresholds may be based on an assumed or determined tractive limit of the vehicle. In other words, a maximum aggression score might be determined to occur when forward acceleration causes the vehicle tires to slip or spin on the road. Likewise, a maximum aggression score might be determined to occur when a braking action causes the vehicle tires to slip or slide, or an anti-lock braking system to be actuated. And a maximum aggression score might be determined to occur when a steering action causes the vehicle to slip on the road due to lateral acceleration beyond the vehicle traction limits. Of course, the maximum aggression limit could be set lower than the vehicle traction limits, if desired.

Further, in at least some implementations, the driving factors may alter the thresholds and aggression rating determined by the system. For example, if weather conditions are such that road conditions are wet or snowy or icy, or the ambient temperature is cold and the vehicle tires are cold, or the conditions are otherwise such that the vehicle has less traction than it would on normal, dry road conditions, then the baseline may be reduced. Thus, in conditions in which the vehicle traction is reduced, the limits may be reduced by the system so that the aggression rating is set as a function of the exiting conditions experienced by the vehicle. For example, smaller accelerations on icy roads may be determined to be as aggressive (e.g. assigned as high of an aggression rating) as larger accelerations on dry roads.

Still further, a following distance threshold may be used, where the following distance is the distance of the vehicle to a vehicle ahead of the vehicle in the path of travel. The following distance may be determined by one or more object detection sensors 49 (labeled in FIGS. 1 and 2), such as a camera, radar, lidar or the like sensors that may be used to determine the presence and location of obstacles, the road, lane markers for the road, and the like. The following distance threshold may be set as a function of one or both of the vehicle speed and the driving factors, especially those that reduce vehicle traction. In this way, a certain following distance would provide a higher aggression rating at a higher vehicle speed than at a lower vehicle speed, and a certain following distance would provide a higher aggression rating in reduced traction conditions than in greater traction conditions.

In generally, more aggressive driving uses greater energy and reduces the effective range of the vehicle, and can wear out tires, brakes and other vehicle components more quickly than less aggressive driving. Further, in electric and hybrid-electric vehicles, regenerative braking strategies may be used to charge vehicle batteries and improve vehicle range. A driver who brakes and decelerates the vehicle 10 more rapidly can provide a lower regenerative braking energy recover than a driver who brakes/decelerates over a greater distance and time. These are representative and not limiting examples of how driver habits and style of operating the vehicle 10 can affect energy use and efficiency, and vehicle use and efficiency.

The driver aggression rating and monitoring can be used to more accurately determine a projected energy use of the vehicle and thereby provide a more accurate range estimation to the driver. Further, the system can provide feedback to the driver regarding the level of aggression, including warnings or other information at aggressions ratings above a feedback threshold, for example. This information may be provided in the form of a text message on a vehicle display, an audible message or signal, or tactile feedback such as vibration of a vehicle component (e.g. steering wheel, seat, accelerator or brake pedal), or otherwise as desired. The information can be geared toward reducing the driver's aggressive driving to improve vehicle efficiency and also safety. In addition to this real-time feedback, the system can provide a report to a driver after the vehicle is used. The report can include information relating to, for example, increased energy use and decreased vehicle range, projected increased cost of the trip (e.g. as a function of one or more of energy cost, estimated cost of vehicle component useful reduction (e.g. tires/brakes) and the like). If desired, the report can note instances of decreased vehicle stability, provide guidance on how to reduce aggressive habits and improve vehicle efficiency and safety.

Figure 7:
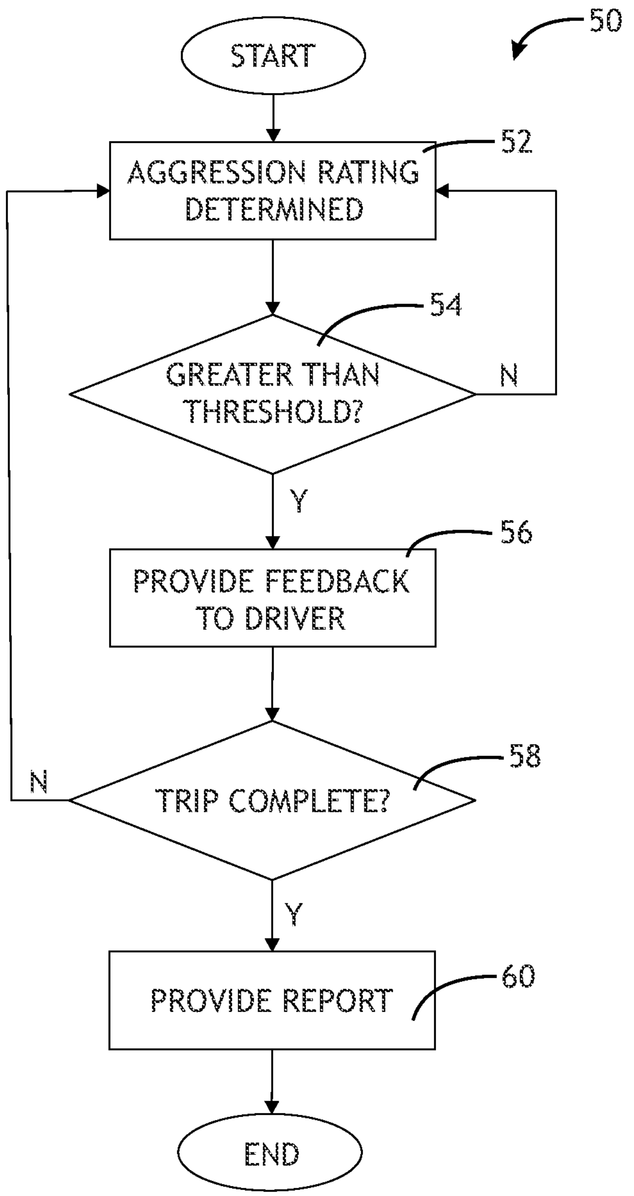
FIG. 7 is a flowchart of a method for determining an aggression rating during use of a vehicle, and providing feedback to a driver.

In the example method 50 of FIG. 7, in step 52 an aggression rating is monitored and determined either continuously or at a desired frequency. In step 54 it is determined if an aggression rating or any monitored dynamic parameter (e.g. acceleration or speed) is beyond a threshold. If not, the method may return to step 52 for continued monitoring of driver aggression and the various dynamic parameters used to determine same. If it is determined in step 54 that a threshold has been exceeded, the method continues to step 56.

In step 56, feedback is provided to the driver, in any desired form. The feedback may be provided at the time of or as close to the time of when the threshold is exceeded so that the driver receives feedback contemporaneously with the driving condition causing the feedback to be provided. In at least some implementations, the feedback is delayed if the system determines that providing the feedback might distract the driver and interfere with safe navigation of the vehicle. This may occur, for example, if a dynamic parameter is determined to be such as to cause or be likely or nearly cause a vehicle instability event in which control of the vehicle may be compromised (e.g. traction loss).

After step 56, the method may continue to step 58 in which it is determined if the vehicle trip is complete. This may be determined by, for example, the vehicle being turned off and/or a driver exiting the vehicle. If the trip is no complete, the method may return to step 52 for continued monitoring of dynamic parameters and driver aggression. If the trip is determined to be complete, the method continues to step 60.

In step 60, a report is provided. The report may, as noted herein, relate to the driver aggression, energy use, safety issues, and the like. And the report may provide coaching and recommendations for improved driving habits, energy use, safety and the like. The report could note a percent or duration of the trip in which the driver was too aggressive, or within a desired aggression range, may include a graph or other visual representation of the accelerations and/or aggression ratings during different portions of the trip, or graphed throughout the trip, as desired.

The report may be accessible within the vehicle, such as by being displayed on a screen within the vehicle, or provided to a user by email, text, or other communication mode, or it may be obtained from a website or other remote source for later viewing. To facilitate communication and accessibility of the report, the data and the report may be stored within the vehicle control system and/or remotely in a remote server like a cloud storage server, which may be communicated with the vehicle via a telematics unit in known manner, and which may be separately accessible by a user via an internet interface in known manner. In at least some implementations, the subject matters in the report may be chosen/customized by the driver, and the dynamic parameters monitored may also be chosen/customized by the driver. After the report is provided or otherwise made available, the method may end and may re-start again upon keying on the vehicle for a subsequent trip. In addition to the report, the system may enable production of a report or keeping of data over a number of trips and not just in a single trip. In this way, the aggression rating and driving habits of a driver can be determined over time to show whether driving habits are improving, and if so, to show estimated cost savings, vehicle range improvements, and the like.

The methods disclosed herein may include steps that may be carried out in a different order and by systems integrated into the vehicle 10, remote devices that communicate with the vehicle 10, or both. Further, more or fewer method steps may be used in different implementations of the method, as desired. The methods and systems of the disclosure can relate to any type of vehicle, and the vehicles may be used for any purpose.

What is claimed is:

1. A method of determining an aggression rating during operation of a vehicle, comprising:

determining with sensors in a vehicle a magnitude and direction of a first acceleration of the vehicle;

comparing the magnitude of the first acceleration to a first acceleration threshold that relates to vehicle acceleration in the determined direction, wherein the first acceleration threshold is associated with an increasing vehicle speed and the threshold is set as a function of a magnitude of acceleration at which a tire of the vehicle will slip;

determining an aggression rating based at least in part on a magnitude of the difference between the first acceleration and the first acceleration threshold, where a greater difference results in a higher aggression rating indicating higher driving aggression; and providing an output to a driver of the vehicle when the aggression rating exceeds a threshold for the aggression rating.

2. The method of claim 1 wherein the magnitude of acceleration at which a tire of the vehicle will slip is determined based upon actuation of a traction control system of the vehicle.

3. The method of claim 1 wherein the first acceleration threshold is set at a magnitude of acceleration below that at which a tire of the vehicle will slip.

4. The method of claim 1 which also includes determining a second acceleration of the vehicle, wherein the second acceleration is associated with a decreasing speed of the vehicle.

5. The method of claim 4 wherein the aggression rating is determined at least in part as a function of a magnitude of the second acceleration.

6. The method of claim 1 which also includes determining a third acceleration of the vehicle, wherein the third acceleration is a lateral acceleration associated with turning of the vehicle.

7. The method of claim 6 wherein the aggression rating is determined at least in part as a function of a magnitude of the third acceleration.

8. The method of claim 1 wherein the aggression rating includes a baseline aggression level that is determined as a function of an acceleration level that is less than the first acceleration threshold.

9. The method of claim 1 which also includes determining a vehicle speed, comparing the vehicle speed to a speed threshold and providing an output to the driver of the vehicle that includes information relating to a differential between the vehicle speed and the speed threshold.

10. The method of claim 1 wherein the first acceleration threshold is adjusted as a function of a driving condition that is determined to reduce a traction level of the vehicle.

11. The method of claim 1 which also includes determining a following distance of the vehicle, and wherein the aggression rating is based in part on the determined following distance.

12. The method of claim 1 wherein the first acceleration is associated with an increasing speed of the vehicle, and wherein a second acceleration is monitored and a third acceleration is monitored, the second acceleration is associated with a decreasing speed of the vehicle and the third acceleration is associated with turning of the vehicle, and wherein the output is provided when the second acceleration exceeds a second acceleration threshold or when the third acceleration exceeds a third acceleration threshold.

13. The method of claim 1 which includes determining one or more driving conditions that affect a traction level of the vehicle, and adjusting the first acceleration threshold as a function of the one or more driving conditions.

14. A method of determining an aggression rating during operation of a vehicle, comprising:

monitoring, during a trip of a vehicle and with sensors of the vehicle, the vehicle speed, vehicle acceleration due to increasing speed of the vehicle, vehicle acceleration due to decreasing speed of the vehicle, and vehicle acceleration during turning of the vehicle during a vehicle trip;

determining aggression ratings periodically or continuously during the vehicle trip, where the aggression ratings are based at least in part on a magnitude of a difference between one or a combination of more than one of:

a) the vehicle speed and a speed threshold, b) a difference between the vehicle acceleration due to increasing speed of the vehicle and a first acceleration threshold, c) a difference between the vehicle acceleration due to decreasing speed of the vehicle and a second acceleration threshold, and d) a difference between the vehicle acceleration during turning of the vehicle and a third acceleration threshold; and providing an output to a driver of the vehicle when the aggression rating exceeds a threshold aggression rating and wherein the output includes information relating to the current aggression rating; and determining that the vehicle trip has ended and providing a report wherein the report includes information relating to the aggression ratings determined over time during the vehicle trip wherein one or more of the first acceleration threshold, the second acceleration threshold and the third acceleration threshold is set as a function of a magnitude of acceleration at which a tire of the vehicle will slip.

15. The method of claim 14 which also includes determining a following distance of the vehicle, and wherein the aggression rating is based at least in part on the determined following distance.

16. The method of claim 14 wherein the magnitude of the first acceleration threshold is different than the magnitude of the second acceleration threshold.

17. The method of claim 1 wherein the first acceleration is associated with an increasing speed of the vehicle, and wherein a second acceleration is monitored and a third acceleration is monitored, the second acceleration is associated with a decreasing speed of the vehicle and the third acceleration is associated with turning of the vehicle, and wherein the aggression rating is determined as a function of one or more of a difference between the first acceleration and the first acceleration threshold, a difference between the second acceleration and a second acceleration threshold, and a difference between the third acceleration and a third acceleration threshold.

18. The method of claim 17 wherein the output is provided when the first acceleration exceeds the first acceleration threshold, or when the second acceleration exceeds the second acceleration threshold, or when the third acceleration exceeds the third acceleration threshold.

19. The method of claim 1 which also includes storing information related to the aggression ratings determined over time during a vehicle trip, determining that the vehicle trip has ended, and providing a report that includes information relating to the aggression ratings determined over time during the vehicle trip.

* * * * *